United States Patent
Chou et al.

(10) Patent No.: US 11,080,074 B2
(45) Date of Patent: Aug. 3, 2021

(54) INSTANTIATION OF A VIRTUAL NETWORK FUNCTION (VNF) AS PART OF A GNODEB (GNB)

(71) Applicant: Apple Inc., Cupertino, CA (US)

(72) Inventors: Joey Chou, Scottsdale, AZ (US); Yizhi Yao, Chandler, AZ (US)

(73) Assignee: Apple Inc., Cupertino, CA (US)

( * ) Notice: Subject to any disclaimer, the term of this patent is extended or adjusted under 35 U.S.C. 154(b) by 72 days.

(21) Appl. No.: 16/484,422

(22) PCT Filed: Mar. 12, 2018

(86) PCT No.: PCT/US2018/022057
§ 371 (c)(1),
(2) Date: Aug. 7, 2019

(87) PCT Pub. No.: WO2018/169884
PCT Pub. Date: Sep. 20, 2018

(65) Prior Publication Data
US 2020/0034165 A1 Jan. 30, 2020

Related U.S. Application Data (60) Provisional application No. 62/471,256, filed on Mar. 14, 2017.

(51) Int. Cl.
*G06F 9/455* (2018.01)
*H04W 88/08* (2009.01)

(52) U.S. Cl.
CPC .......... *G06F 9/455* (2013.01); *H04W 88/085* (2013.01)

(58) Field of Classification Search
CPC .......................... G06F 9/455; H04W 88/085
See application file for complete search history.

(56) References Cited

U.S. PATENT DOCUMENTS

2017/0070617 A1 * 3/2017 Vasudevan ............ H04W 28/08

OTHER PUBLICATIONS

3GPP Technical Specification Group, "Lifecycle Management (LCM) for Mobile Networks that Include Virtualized Network Functions" Ver.14.0.0—Mar. 2017) (Year: 2017).*
3GPP Technical Specification Group, "Lifecycle Management (LCM) for Mobile Network which Include Virtualized Network Functions", Vers.14.0.0 (Year: 2017).*
International Patent Office—International Search Report and Written Opinion dated Jun. 12, 2018, from International Application No. PCT/US2018/022057, 18 pages.

(Continued)

*Primary Examiner* — Jamaal Henson
(74) *Attorney, Agent, or Firm* — Eschweiler & Potashnik, LLC (57) ABSTRACT

Examples provide an apparatus for instantiating a virtualised part of a next generation Node B, gNB, comprising a Network Functions Virtualisation Orchestrator, operable to carry out any one or more tasks including on-boarding an VNF package, on-boarding a PNF Descriptor on-boarding a Network Service Descriptor, enabling the VNF package, enabling the Network Service Descriptor, and sending appropriate responses to a Network Manager. Examples also provide corresponding methods.

7 Claims, 3 Drawing Sheets

(56) References Cited

OTHER PUBLICATIONS

3GPP, "Technical Specification Group Services and System Aspects; Telecommunication management; Study on management aspects of virtualized network functions that are part of the New Radio (NR) (Release 15)," 3GPP TR 32.864 V0.2.0 (207-02), Lte Advanced Pro, 10 pages.

3GPP, "Technical Specification Group Radio Access Network; Study on New Radio Access Technology; Radio Access Architecture and Interfaces (Release 14)," 3GPP TR 38.801 V2.0.0 (Mar. 2017), Lte Advanced Pro, 90 pages.

3GPP, "Technical Specification Group Services and System Aspects; Telecommunication management; Life Cycle Management (LCM) for mobile networks that include virtualized network functions; Procedures (Release 14)," 3GPP TS 28.526 V1.0.0 (Mar. 2017), Lte Advanced Pro, 36 pages.

ETSI, "Network Functions Virtualisation (NFV); Management and Orchestration; Os-Ma-Nfvo reference point—Interface and Information Model Specification," ETSI GS NFV-IFA 013 V2.1.1 (Oct. 2016), 127 pages.

Intel, "pCR TR 32.864 add UCs on instantiation of NS containing VNF and/or PNF," 3GPP TSG SA WG5 (Telecom Management) Meeting #111, S5-171073, Agenda item: 6.5.9, Jan. 16-20, 2017, Porto, Portugal, 4 pages.

Intel, "pCR TR 32.864 add UC on NS update to instantiate a new VNF instance or add a PNF instance," 3GPP TSG SA WG5 (Telecom Management) Meeting #111, S5-171074, Agenda item: 6.5.9, Jan. 16-20, 2017, Porto, Portugal, 3 pages.

ETSI, "Network Functions Virtualisation (NFV); Management and Orchestration; Network Service Templates Specification," ETSI GS NFV-IFA 014 V2.1.1 (Oct. 2016), 35 pages.

ETSI, "Network Functions Virtualisation (NFV); Management and Orchestration; VNF Packaging Specification," ETSI GS NFV-IFA 011 V2.1.1 (Oct. 2016), 53 pages.

\* cited by examiner

INSTANTIATION OF A VIRTUAL NETWORK FUNCTION (VNF) AS PART OF A GNODEB (GNB)

CROSS REFERENCE TO RELATED APPLICATION

The present is a national phase entry under 35 U.S.C. § 371 of International Application No. PCT/US2018/022057, filed Mar. 12, 2018, entitled "INSTANTIATION OF A VIRTUAL NETWORK FUNCTION (VNF) AS PART OF A GNODEB (GNB)," which application claims priority to U.S. Provisional Patent Application No. 62/471,256, filed Mar. 14, 2017, entitled "INSTANTIATION OF A VIRTUAL NETWORK FUNCTION (VNF) AS PART OF A GNODEB (GNB)," the entire disclosures of which are hereby incorporated by reference.

BACKGROUND

Various embodiments generally may relate to the field of wireless communications.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Before an operator deploys a Network Service (NS) that includes a virtualized part of a next generation Node B (gNB), the Network Service Descriptor (NSD) to be used by a Network Functions Virtualisation Orchestrator (NFVO) to manage the Network Service needs to be on-boarded.

According to the document RAN3 TR 38.801 V2.0.0 (2017-03), which is hereby incorporated by reference in its entirety, the Centralized Unit (CU)/Distributed Unit (DU) functional split options are configurable, as follows:

Per Centralized Unit: each Centralized Unit has a fixed split, and the Distributed Units are configured to match this fixed split.

Per Distributed Unit: each Distributed Unit can be configured with a different split. The choice of a Distributed Unit split may depend on specific topology or backhaul support in a given area.

Note that in the Per Distributed Unit option, one Centralized Unit may need to support different split levels in different interfaces, which is not the case in the Per Centralized Unit option.

According to examples of the present disclosure, it is possible to change a Centralized Unit/Distributed Unit functional split through configuration without any software update, because the software can support all function split options. However, to support such function split changes, the transport network requirements between the Centralized Unit and the Distributed Unit may need to be changed, and the location constraints where the Centralized Unit needs to be deployed may also need to be updated.

Figure 1:
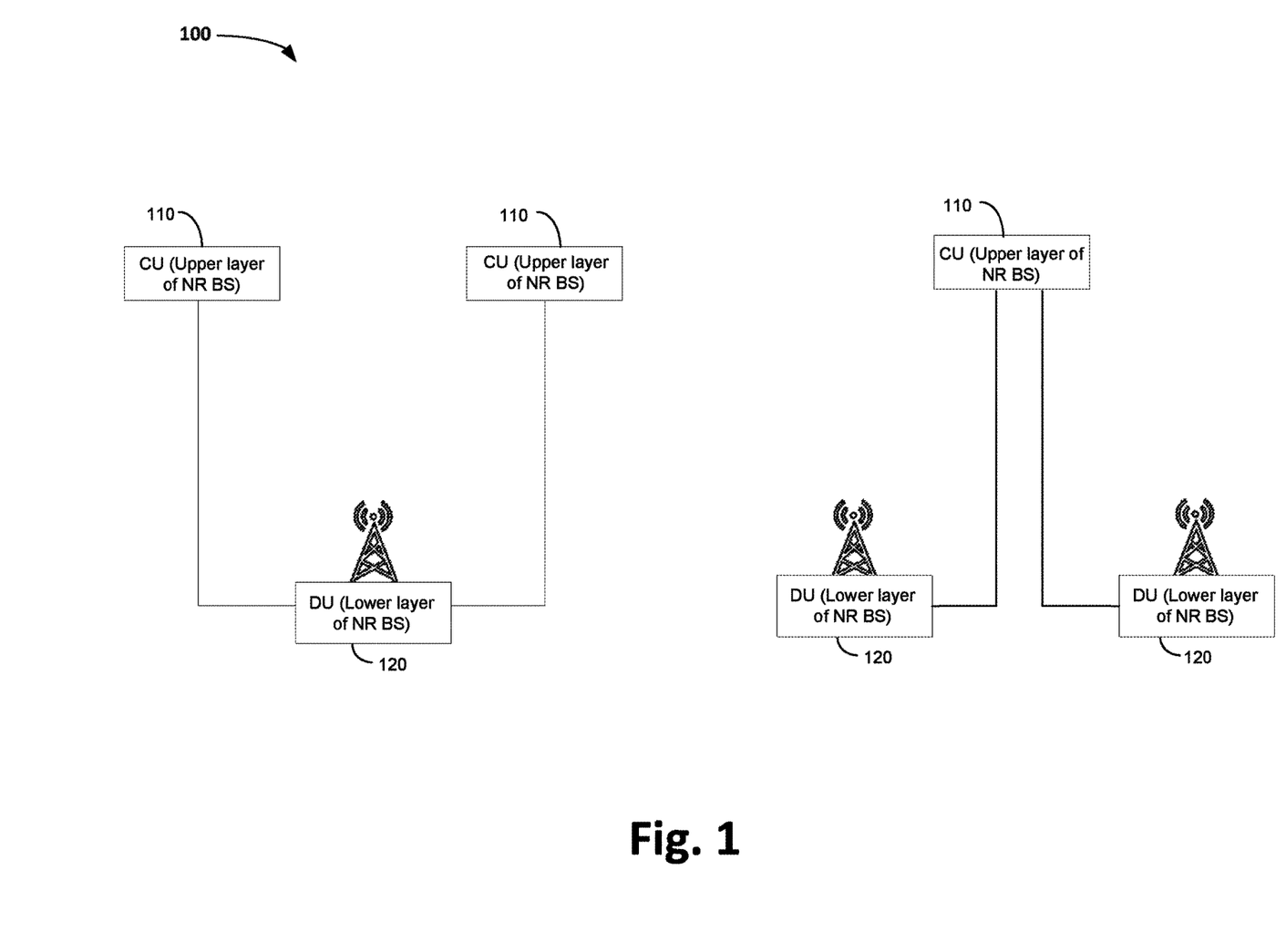
FIG. 1 depicts an example of new radio (NR) radio access network (RAN) node architecture.

FIG. 1 shows the architecture 100 of the New Radio-Radio Access Networks (NR-RAN) that comprises a Centralized Unit(s) 110 that is implemented as a Virtualised Network Function running in the cloud, and a Distributed Unit(s) 120 running in the cell site that provide wireless communication to the User Equipment (UE). A Centralized Unit 110 may be connected to one or more Distributed Unit(s) 120. A Distributed Unit 120 may be connected to one or more Centralized Unit(s) 110.

Figure 2:
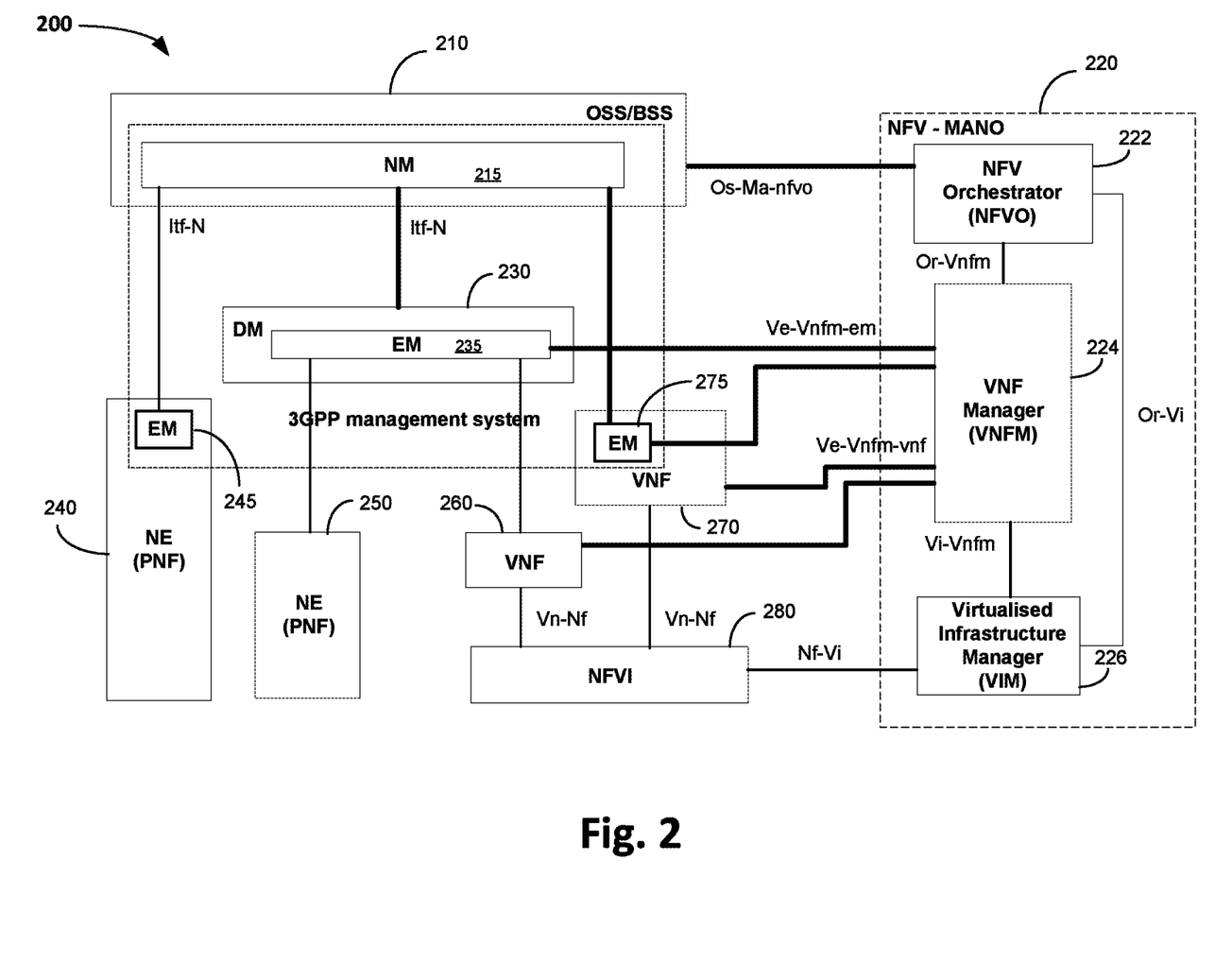
FIG. 2 depicts an example of a network functions virtualization (NFV) management architectural framework.

FIG. 2 shows the Network Functions Virtualisation management architectural framework 200, which is applicable for managing the New Radio RAN that includes the Virtualised Network Functions (VNFs).

In the example embodiment shown, an Operations Support System/Business Support System (OSS/BSS) 210 contains a Network Manager 215. A Network Functions Virtualisation Manager and Orchestrator (NFV-MANO) 220 contains a Network Functions Virtualisation Orchestrator (NFVO) 222, a Virtualised Network Function Manager (VNFM) 224 and a Virtualised Infrastructure Manager (VIM) 266. The Network Functions Virtualisation Orchestrator 222 is communicatively coupled to the Operations Support System/Business Support System 210 by the interface Os-Ma-nfvo. The Network Functions Virtualisation Orchestrator 222 is communicatively coupled to the Virtualised Network Function Manager 224 by the interface Or-Vnfm. The Network Functions Virtualisation Orchestrator 222 is further communicatively coupled to the Virtualised Infrastructure Manager 226 by the interface Or-Vi. The Virtualised Network Function Manager 224 is communicatively coupled to the Virtualised Infrastructure Manager 226 by the interface Vi-Vnfm. The Network Functions Virtualisation management architectural framework 200 also comprises a Device Manager (DM) 230 containing an Element Manager 235. The Device Manager 230 is communicatively coupled to the Network Manager 215 by the interface Itf-N. The Element Manager 235 is further communicatively coupled to the Virtualised Network Function Manager 224 by the interface Ve-Vnfm-em. A Network Element Physical Network Function(s) 240 may contain an Element Manager 245. The Element Manager 245 is communicatively coupled to the Network Manager 215 by the interface Itf-N. A Network Element Physical Network Function(s) 250 may be communicatively coupled to the Element Manager 235. A Virtualised Network Function(s) 260 may be communicatively coupled to the Element Manager 235. The Virtualised Network Function(s) 260 may be further communicatively coupled to the Virtualised Network Function Manager 224 by the interface Ve-Vnfm-Vnf. A Virtualised Network Function(s) 270 may contain an Element Manager 275. The Element Manager 275 is communicatively coupled to the Network Manager 215. The Element Manager 275 may be further communicatively coupled to the Virtualised Network Function Manager 224 by the interface Ve-Vnfm-em. The Virtualised Network Function(s) 270 may be communicatively coupled to the Virtualised Network Function Manager 224 by the interface Ve-Vnfm-vnf. A Network Function Virtualisation Infrastructure 280 is communicatively coupled to the Virtualised Network Function(s) 260, 270 by the interface Vn-Nf. The Network Function Virtualisation Infrastructure 280 is further communicatively coupled to the Virtualised Infrastructure Manager 226 by the interface Nf-Vi. In the foregoing, the interface names are only exemplary and are descriptive of the logical entities involved in the communications over the respectively named interfaces.

There now follows examples of the use cases on the deployment of the virtualized part of gNB, according to embodiments of the present disclosure.

On-board Network Service Descriptor that references the Virtualised Network Function Descriptor of virtualized part of gNB. Issues: The Operator may need to be able to deploy a Network Service that includes the virtualized part of the gNB; The Network Service Descriptor may need to be on-boarded to the Network Functions Virtualisation Orchestrator before deploying the Network Service. Pre-conditions: In some embodiments, that the Virtualised Network Function package for the virtualized part of a gNB has been on-boarded to the Network Functions Virtualisation Orchestrator; In some embodiments, that the Virtualised Network Function packages for other constituent Virtualised Network Functions, if any, have been on-boarded to the Network Functions Virtualisation Orchestrator; In some embodiments, that the Physical Network Function Descriptors (PNFDs) for the constituent Physical Network Functions, if any, have been on boarded to Network Functions Virtualisation Orchestrator. Description: The Network Manager requests the Network Functions Virtualisation Orchestrator to on-board the Network Service Descriptor that references to the Virtualised Network Function Descriptor (VNFD) of the virtualized part of gNB. In the Network Service Descriptor, the following information should be referenced or included, if needed for a particular implementation: at least one Virtualised Network Function Descriptor of the virtualized part of the gNB; the Virtualised Network Function Descriptors of other constituent Virtualised Network Functions, if needed; the Physical Network Function Descriptors of constituent Physical Network Functions, if needed; nested Network Service Descriptors, if needed; a Virtualised Network Function Forwarding Graph Descriptor (VNFFGD) that includes the Virtual Link Descriptors (VLDs) needed for connecting the Virtualised Network Function that is part of the gNB with other Virtualised Network Functions/Physical Network Functions, if needed (i.e. the Virtual Link profile). The Network Functions Virtualisation Orchestrator on-boards the Network Service Descriptor, and responds to Network Manager to indicate the successful on-boarding. Post-conditions: the Network Service Descriptor referencing the Virtualised Network Function Descriptor of the virtualized part of the gNB has been on-boarded.

Update of transport network requirements. Issues: the Centralized Unit/Distributed Unit functional split options are configurable according to TR 38.801 V2.0.0 (2017-03): Per Centralized Unit: each Centralized Unit has a fixed split, and the Distributed Units are configured to match this; Per Distributed Unit: each Distributed Unit can be configured with a different split. The choice of a Distributed Unit split may depend on specific topology or backhaul support in a given area. Note that in the Per Distributed Unit option, one Centralized Unit may need to support different split levels in different interfaces, which is not the case in the Per Centralized Unit option.

According to examples of the present disclosure, the Centralized Unit may support multiple functional split options, and may not need software update to support a Centralized Unit/Distributed Unit functional split option change, because the software can support all function split options. However, the functional split change may result in different Centralized Unit/Distributed Unit transport network requirements, or result in location constraints where the Centralized Unit needs to be deployed. Pre-conditions: In some embodiments, that the instance of the virtualized part of a gNB already exists; In some embodiments, that the transport network requirements between the virtualized part and the non-virtualized part of a gNB need to be updated, e.g., to support the change of Centralized Unit/Distributed Unit functional split option; In some embodiments, that the Descriptor of the non-virtualized part of the gNB has been on boarded to the Network Functions Virtualisation Orchestrator. Description: the Network Manager requests the Element Manager to configure the Centralized Unit and Distributed Unit to support a different functional split option; the Element Manager configures the Centralized Unit and Distributed Unit as per the request from the Network Manager, and responds to the Network Manager to indicate successful configuration; the Network Manager requests the Network Functions Virtualisation Orchestrator to update the transport network requirements between the virtualized part and the non-virtualized part of a gNB, with the following information: the updated underlying transport network requirements (e.g. bandwidth, latency, transport network type (e.g. optical)) for the interface between the virtualized part and the non-virtualized part of a gNB; Optionally, the updated location constraints for the Network Functions Virtualisation Infrastructure (NFVI) where the virtualized part of a gNB needs to be deployed; Network Functions Virtualisation Orchestrator updates Virtual Link to meet the updated transport network requirements between the virtualized part and non-virtualized part of a gNB; Network Functions Virtualisation Orchestrator responds to Network Manager to indicate the transport network requirements have been updated successfully. Post-conditions: the updated transport network requirements between virtualized part and non-virtualized part of a gNB have been supported.

There now follows some example solutions on instantiation of the virtualized part of gNB, according to some embodiments.

Potential solutions on instantiation of virtualized part of a gNB. The potential solutions reuse the existing Virtualised Network Function instantiation mechanisms. The virtualized part of a gNB is implemented as Virtualised Network Function, and the non-virtualized part of a gNB is implemented as Physical Network Function. The virtualized part of a gNB can be instantiated Via Instantiate Network Service or Update Network Service operations.

Instantiating the virtualized part of gNB by instantiating a new Network Service. This solution is used when the virtualized part of a gNB is instantiated. Network Manager requests Network Functions Virtualisation Orchestrator to on-board the Virtualised Network Function package for the virtualized part of a gNB, if it has not yet been on-boarded. Network Functions Virtualisation Orchestrator responds to Network Manager about the successful on-boarding with the parameters onboardedVnfPkgInfold and vnfdId. Network Manager requests Network Functions Virtualisation Orchestrator to on-board the Physical Network Function Descriptor for the non-virtualized part of a gNB, if it has not yet been on-boarded. Network Functions Virtualisation Orchestrator responds to Network Manager about the successful on-boarding with the parameter pnfdInfold. Network Manager requests Network Functions Virtualisation Orchestrator to on-board the Network Service Descriptor that is referencing the Virtualised Network Function Descriptor and Physical Network Function Descriptor above-mentioned, if the Network Service Descriptor has not yet been on-boarded. The Network Service Descriptor contains the Virtualised Network Function Forwarding Graph Descriptor and the Virtual Link Descriptor where the transport network requirements (e.g., latency, bandwidth) between Virtualised Network Function part of the gNB and Physical Network Function part of the gNB are included. Network Functions Virtualisation Orchestrator responds to Network Manager about the successful on-boarding with parameter nsdInfoId. Network Manager requests Network Functions Virtualisation Orchestrator to enable the Virtualised Network Function package if it is not enabled. Network Functions Virtualisation Orchestrator responds to Network Manager about the successful enabling. Network Manager requests Network Functions Virtualisation Orchestrator to enable the Network Service Descriptor if it is not enabled. Network Functions Virtualisation Orchestrator responds to Network Manager about the successful enabling. Network Manager requests Network Functions Virtualisation Orchestrator to create the Network Service identifier for the Network Service Descriptor mentioned above. Network Functions Virtualisation Orchestrator responds to Network Manager about the successful creation with the parameter nsInstanceId. Network Manager requests Network Functions Virtualisation Orchestrator to instantiate the Network Service identified by nsInstanceId, with the parameter additionalParamForVnf providing the information for the Virtualised Network Function part of the gNB, parameter locationConstraints indicating the location constraints for the Virtualised Network Function part of the gNB, parameter pnfInfo providing the information of the Physical Network Function part of the gNB, and other parameters if necessary according to the needs of a given implementation. Network Functions Virtualisation Orchestrator sends the Network Service lifecycle change notification to Network Manager indicating the start of Network Service instantiation procedure. Network Functions Virtualisation Orchestrator instantiates the Network Service and the Virtualised Network Function part of the gNB with other Management and Orchestration (MANO) entities, based on the information provide by Network Manager and the information provided in the Network Service Descriptor, Virtualised Network Function package, and Physical Network Function Descriptor. Network Functions Virtualisation Orchestrator sends the Network Service Lifecycle Change notification to Network Manager indicating the result of Network Service instantiation.

Instantiating the virtualized part of gNB by updating an existing Network Service. This solution is used when the virtualized part of a gNB is instantiated when updating an existing Network Service. Network Manager requests Network Functions Virtualisation Orchestrator to on-board the Virtualised Network Function package for the virtualized part of a gNB, if it has not yet been on-boarded. Network Functions Virtualisation Orchestrator responds to Network Manager about the successful on-boarding with the parameters onboardedVnfPkgInfoId and vnfdId. Network Manager requests Network Functions Virtualisation Orchestrator to on-board the Physical Network Function Descriptor for the non-virtualized part of a gNB, if it has not yet been on-boarded. Network Functions Virtualisation Orchestrator responds to Network Manager about the successful on-boarding with the parameter pnfdInfoId. Network Manager requests Network Functions Virtualisation Orchestrator to update the Network Service Descriptor if needed (e.g., to add the constituent Virtualised Network Function Descriptor and Physical Network Function Descriptor above-mentioned, Virtual Link Descriptor, Virtualised Network Functions Forwarding Graphs Descriptor (VNFFGD), etc.). The Network Service Descriptor needs to contain the Virtualised Network Function Forwarding Graph Descriptor and the Virtual Link Descriptor (VLD) where the transport network requirements (e.g., latency, bandwidth) between Virtualised Network Function part of the gNB and Physical Network Function part of the gNB are included. Network Functions Virtualisation Orchestrator responds to Network Manager about the successful on-boarding with parameter nsdInfoId. Network Manager requests Network Functions Virtualisation Orchestrator to enable the Virtualised Network Function package if it is not enabled; Network Functions Virtualisation Orchestrator responds to Network Manager about the successful enabling. Network Manager requests Network Functions Virtualisation Orchestrator to enable the Network Service Descriptor if it is not enabled. Network Functions Virtualisation Orchestrator responds to Network Manager about the successful enabling. Network Manager requests Network Functions Virtualisation Orchestrator to update the Network Service identified by nsInstanceId, with the parameter updateType="InstantiateVnf", and parameter instantiateVnfData providing the information for the Virtualised Network Function part of the gNB. The parameter instantiateVnfData may contain attribute extVirtualLink specifying the transport network requirements between Virtualised Network Function part and Physical Network Function part of the gNB, attribute locationConstraints indicating the location constraints for the Virtualised Network Function part of the gNB to be instantiated, and other attributes if necessary according to the needs of a given implementation. Network Functions Virtualisation Orchestrator sends the Network Service lifecycle change notification to Network Manager indicating the start of Network Service update procedure. Network Functions Virtualisation Orchestrator updates the Network Service and instantiates the Virtualised Network Function part of the gNB with other MANO entities, based on the information provide by Network Manager and the information provided in the Network Service Descriptor, Virtualised Network Function package, Physical Network Function Descriptor. Network Functions Virtualisation Orchestrator sends the Network Service Lifecycle Change notification to Network Manager indicating the result of Network Service update.

By way of background to the present disclosure, documents: 3GPP TR 38.864: "Study on management aspects of virtualized network functions that are part of the New Radio (NR)", Version V0.2.0 (2017-02); ETSI GS NFV-IFA 013 v2.1.1: "Network Functions Virtualisation (NFV); Management and Orchestration; Os-Ma-Nfvo reference point—Interface and Information Model Specification"; ETSI GS NFV-IFA 014 v2.1.1: "Network Functions Virtualisation (NFV); Management and Orchestration; Network Service Templates Specification"; and ETSI GS NFV-IFA 011 v2.1.1: "Network Functions Virtualisation (NFV); Management and Orchestration; Virtualised Network Function Packaging Specification" are all hereby incorporated by reference in their entirety.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 3:
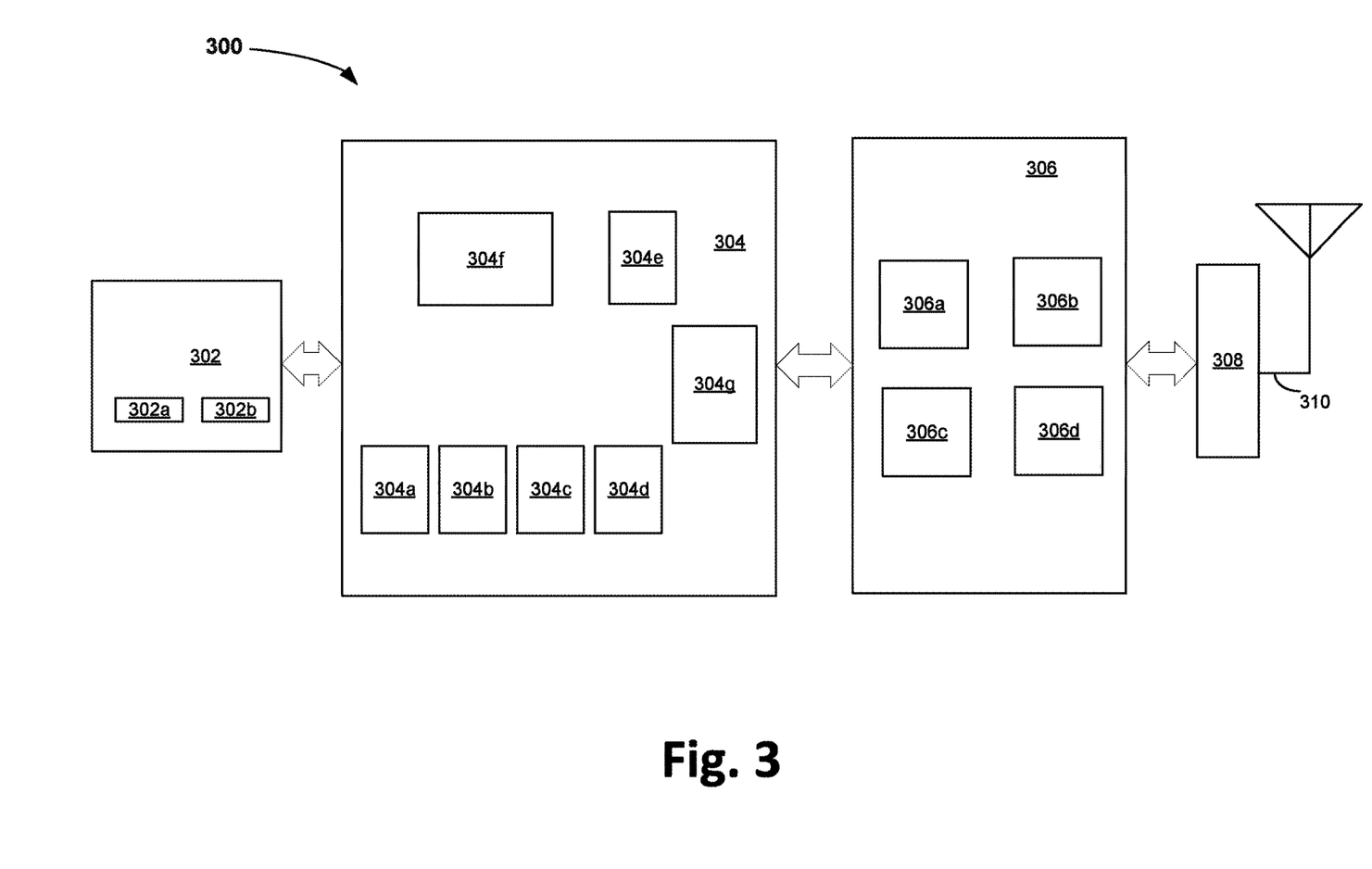
FIG. 3 depicts an example electronic device.

Embodiments described herein may be implemented into a system using any suitably configured hardware and/or software. FIG. 3 illustrates, for one embodiment, example components of an electronic device 300. In embodiments, the electronic device 300 may be, implement, be incorporated into, or otherwise be a part of a user equipment (UE), an evolved NodeB (eNB), and/or some other electronic device. In some embodiments, the electronic device 300 may include application circuitry 302, baseband circuitry 304, Radio Frequency (RF) circuitry 306, front-end module (FEM) circuitry 308 and one or more antennas 310, coupled together at least as shown. In embodiments where the electronic device 300 is implemented in or by an eNB, the electronic device 300 may also include network interface circuitry (not shown) for communicating over a wired interface (for example, an X2 interface, an S1 interface, and the like).

The application circuitry 302 may include one or more application processors. For example, the application circuitry 302 may include circuitry such as, but not limited to, one or more single-core or multi-core processors 302a. The processor(s) 302a may include any combination of general-purpose processors and dedicated processors (e.g., graphics processors, application processors, etc.). The processors 302a may be coupled with and/or may include computer-readable media 302b (also referred to as "CRM 302b", "memory 302b", "storage 302b", or "memory/storage 302b") and may be configured to execute instructions stored in the CRM 302b to enable various applications and/or operating systems to run on the system.

The baseband circuitry 304 may include circuitry such as, but not limited to, one or more single-core or multi-core processors. The baseband circuitry 304 may include one or more baseband processors and/or control logic to process baseband signals received from a receive signal path of the RF circuitry 306 and to generate baseband signals for a transmit signal path of the RF circuitry 306. Baseband circuitry 304 may interface with the application circuitry 302 for generation and processing of the baseband signals and for controlling operations of the RF circuitry 306. For example, in some embodiments, the baseband circuitry 304 may include a second generation (2G) baseband processor 304a, third generation (3G) baseband processor 304b, fourth generation (4G) baseband processor 304c, and/or other baseband processor(s) 304d for other existing generations, generations in development or to be developed in the future (e.g., fifth generation (5G), 6G, etc.). The baseband circuitry 304 (e.g., one or more of baseband processors 304a-d) may handle various radio control functions that enable communication with one or more radio networks via the RF circuitry 306. The radio control functions may include, but are not limited to, signal modulation/demodulation, encoding/decoding, radio frequency shifting, and the like. In some embodiments, modulation/demodulation circuitry of the baseband circuitry 304 may include Fast-Fourier Transform (FFT), precoding, and/or constellation mapping/demapping functionality. In some embodiments, encoding/decoding circuitry of the baseband circuitry 304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 304e of the baseband circuitry 304 may be configured to run elements of the protocol stack for signaling of the PHY, MAC, RLC, PDCP and/or RRC layers. In some embodiments, the baseband circuitry may include one or more audio digital signal processor(s) (DSP) 304f. The audio DSP(s) 304f may include elements for compression/decompression and echo cancellation and may include other suitable processing elements in other embodiments. The baseband circuitry 304 may further include computer-readable media 304g (also referred to as "CRM 304g", "memory 304g", "storage 304g", or "CRM 304g"). The CRM 304g may be used to load and store data and/or instructions for operations performed by the processors of the baseband circuitry 304. CRM 304g for one embodiment may include any combination of suitable volatile memory and/or non-volatile memory. The CRM 304g may include any combination of various levels of memory/storage including, but not limited to, read-only memory (ROM) having embedded software instructions (e.g., firmware), random access memory (e.g., dynamic random access memory (DRAM)), cache, buffers, etc.). The CRM 304g may be shared among the various processors or dedicated to particular processors. Components of the baseband circuitry 304 may be suitably combined in a single chip, a single chipset, or disposed on a same circuit board in some embodiments. In some embodiments, some or all of the constituent components of the baseband circuitry 304 and the application circuitry 302 may be implemented together, such as, for example, on a system on a chip (SOC).

In some embodiments, the baseband circuitry 304 may provide for communication compatible with one or more radio technologies. For example, in some embodiments, the baseband circuitry 304 may support communication with an E-UTRAN and/or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc., to facilitate the communication with the wireless network. RF circuitry 306 may include a receive signal path that may include circuitry to down-convert RF signals received from the FEM circuitry 308 and provide baseband signals to the baseband circuitry 304. RF circuitry 306 may also include a transmit signal path that may include circuitry to up-convert baseband signals provided by the baseband circuitry 304 and provide RF output signals to the FEM circuitry 308 for transmission.

In some embodiments, the RF circuitry 306 may include a receive signal path and a transmit signal path. The receive signal path of the RF circuitry 306 may include mixer circuitry 306a, amplifier circuitry 306b and filter circuitry 306c. The transmit signal path of the RF circuitry 306 may include filter circuitry 306c and mixer circuitry 306a. RF circuitry 306 may also include synthesizer circuitry 306d for synthesizing a frequency for use by the mixer circuitry 306a of the receive signal path and the transmit signal path. In some embodiments, the mixer circuitry 306a of the receive signal path may be configured to down-convert RF signals received from the FEM circuitry 308 based on the synthesized frequency provided by synthesizer circuitry 306d. The amplifier circuitry 306b may be configured to amplify the down-converted signals and the filter circuitry 306c may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306a of the receive signal path may comprise passive mixers, although the scope of the embodiments is not limited in this respect.

In some embodiments, the mixer circuitry 306a of the transmit signal path may be configured to up-convert input baseband signals based on the synthesized frequency provided by the synthesizer circuitry 306d to generate RF output signals for the FEM circuitry 308. The baseband signals may be provided by the baseband circuitry 304 and may be filtered by filter circuitry 306c. The filter circuitry 306c may include a low-pass filter (LPF), although the scope of the embodiments is not limited in this respect.

In some embodiments, the mixer circuitry 306a of the receive signal path and the mixer circuitry 306a of the transmit signal path may include two or more mixers and may be arranged for quadrature downconversion and/or upconversion, respectively. In some embodiments, the mixer circuitry 306a of the receive signal path and the mixer circuitry 306a of the transmit signal path may include two or more mixers and may be arranged for image rejection (e.g., Hartley image rejection). In some embodiments, the mixer circuitry 306a of the receive signal path and the mixer circuitry 306a of the transmit signal path may be arranged for direct downconversion and/or direct upconversion, respectively. In some embodiments, the mixer circuitry 306a of the receive signal path and the mixer circuitry 306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect.

In some embodiments, the synthesizer circuitry 306d may be a fractional-N synthesizer or a fractional N/N+1 synthesizer, although the scope of the embodiments is not limited in this respect, as other types of frequency synthesizers may be suitable. For example, synthesizer circuitry 306d may be a delta-sigma synthesizer, a frequency multiplier, or a synthesizer comprising a phase-locked loop with a frequency divider. The synthesizer circuitry 306d may be configured to synthesize an output frequency for use by the mixer circuitry 306a of the RF circuitry 306 based on a frequency input and a divider control input. In some embodiments, the synthesizer circuitry 306d may be a fractional N/N+1 synthesizer.

In some embodiments, frequency input may be provided by a voltage controlled oscillator (VCO), although that is not a requirement. Divider control input may be provided by either the baseband circuitry 304 or the application circuitry 302 depending on the desired output frequency. In some embodiments, a divider control input (e.g., N) may be determined from a look-up table based on a channel indicated by the application circuitry 302.

Synthesizer circuitry 306d of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 306 may include an IQ/polar converter.

FEM circuitry 308 may include a receive signal path that may include circuitry configured to operate on RF signals received from one or more antennas 310, amplify the received signals and provide the amplified versions of the received signals to the RF circuitry 306 for further processing. FEM circuitry 308 may also include a transmit signal path that may include circuitry configured to amplify signals for transmission provided by the RF circuitry 306 for transmission by one or more of the one or more antennas 310. In some embodiments, the FEM circuitry 308 may include a TX/RX switch to switch between transmit mode and receive mode operation. The FEM circuitry 308 may include a receive signal path and a transmit signal path. The receive signal path of the FEM circuitry may include a low-noise amplifier (LNA) to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310).

In some embodiments, the electronic device 300 may include additional elements such as, for example, a display, a camera, one or more sensors, and/or interface circuitry (for example, input/output (I/O) interfaces or buses) (not shown). In embodiments where the electronic device is implemented in or by an eNB, the electronic device 300 may include network interface circuitry. The network interface circuitry may be one or more computer hardware components that connect electronic device 300 to one or more network elements, such as one or more servers within a core network or one or more other eNBs via a wired connection. To this end, the network interface circuitry may include one or more dedicated processors and/or field programmable gate arrays (FPGAs) to communicate using one or more network communications protocols such as X2 application protocol (AP), S1 AP, Stream Control Transmission Protocol (SCTP), Ethernet, Point-to-Point (PPP), Fiber Distributed Data Interface (FDDI), and/or any other suitable network communications protocols.

In some embodiments, the electronic device of FIG. 3 may be configured to perform one or more processes, techniques, and/or methods as described herein, or portions thereof.

Example 1 may include the Network Manager (NM) comprising one or more processors to:

send a request to NFV Orchestrator (NFVO) to on-board the Virtualised Network Function (VNF) package of the virtualized part of a gNodeB (gNB);

receive from Network Functions Virtualisation Orchestrator the result of Virtualised Network Function package on-boarding; and/or send a request to Network Functions Virtualisation Orchestrator to on-board the Physical Network Function Descriptor (PNFD) of the non-virtualized part of a gNB;

receive from Network Functions Virtualisation Orchestrator the result of Physical Network Function Descriptor on-boarding; and/or send a request to Network Functions Virtualisation Orchestrator to on-board the Network Service Descriptor (NSD) that references the Virtualised Network Function Descriptor (VNFD) of the virtualized part of a gNB and/or Physical Network Function Descriptor of the non-virtualized part of a gNB;

receive from Network Functions Virtualisation Orchestrator the result of Network Service Descriptor on-boarding; and/or send a request to Network Functions Virtualisation Orchestrator to enable the Virtualised Network Function package of the virtualized part of a gNB;

receive from Network Functions Virtualisation Orchestrator the result of Virtualised Network Function package enabling; and/or send a request to Network Functions Virtualisation Orchestrator to enable the Network Service Descriptor that references the Virtualised Network Function Descriptor of the virtualized part of a gNB and/or Physical Network Function Descriptor of the non-virtualized part of a gNB;

receive from Network Functions Virtualisation Orchestrator the result of Network Service Descriptor enabling.

Example 2 may include a Network Functions Virtualisation Orchestrator comprising one or more processors to:

receive a request from Network Manager to on-board the Virtualised Network Function (VNF) package of the virtualized part of a gNB;

send a response to Network Manager to indicate the result of Virtualised Network Function package on-boarding; and/or receive a request from Network Manager to on-board the Physical Network Function Descriptor (PNFD) of the non-virtualized part of a gNB;

send a response to Network Manager to indicate the result of Physical Network Function Descriptor on-boarding; and/or receive a request from Network Manager to on-board the Network Service Descriptor (NSD) that references the Virtualised Network Function Descriptor (VNFD) of the virtualized part of a gNB and/or Physical Network Function Descriptor of the non-virtualized part of a gNB;

send a response to Network Manager to indicate the result of Network Service Descriptor on-boarding; and/or receive a request from Network Manager to enable the Virtualised Network Function package of the virtualized part of a gNB;

send a response to Network Manager to indicate the result of Virtualised Network Function package enabling; and/or receive a request from Network Manager to enable the Network Service Descriptor that references the Virtualised Network Function Descriptor of the virtualized part of a gNB and/or Physical Network Function Descriptor of the non-virtualized part of a gNB;

send a response to Network Manager to indicate the result of Network Service Descriptor enabling.

Example 3 may include the subject matter of example 1 and 2 and/or some other example herein, wherein the virtualized part of gNB is implemented as Virtualised Network Function and the non-virtualized part of gNB is implemented as Physical Network Function.

Example 4 may include the subject matter of examples 1 to 3 and/or some other example herein, wherein the Network Service Descriptor contains the Virtualised Network Function Forwarding Graph Descriptor, and the Virtual Link Descriptor, which includes the transport network requirements between Virtualised Network Function part of the gNB and Physical Network Function part of the gNB.

Example 5 may include a Network Manager (NM) comprising one or more processors to:

send a request to NFV Orchestrator (NFVO) to instantiate an Network Service (NS) that contains the Virtualised Network Function that is part of a gNB;

receive from Network Functions Virtualisation Orchestrator the Network Service lifecycle change notification indicating the start of Network Service instantiation; and receive from Network Functions Virtualisation Orchestrator the Network Service Lifecycle Change notification indicating the result of Network Service instantiation.

Example 6 may include a Network Functions Virtualisation Orchestrator comprising one or more processors to:

receive a request from Network Manager to instantiate an Network Service (NS) that contains the Virtualised Network Function that is part of a gNB;

send the Network Service lifecycle change notification indicating the start of Network Service instantiation to Network Manager; and send the Network Service Lifecycle Change notification indicating the result of Network Service instantiation to Network Manager.

Example 7 may include the subject matter of examples 5 and 6 and/or some other example herein, wherein the Network Service instantiation request includes the parameter additionalParamForVnf providing the information for the Virtualised Network Function part of the gNB, parameter locationConstraints indicating the location constraints for the Virtualised Network Function part of the gNB, and/or parameter pnfInfo providing the information of the Physical Network Function part of the gNB.

Example 8 may include the Network Manager (NM) comprising one or more processors to:

send a request to NFV Orchestrator (NFVO) to update an Network Service that contains the Virtualised Network Function that is part of a gNB; and receive from Network Functions Virtualisation Orchestrator the Network Service lifecycle change notification indicating the start of Network Service update; and receive from Network Functions Virtualisation Orchestrator the Network Service Lifecycle Change notification indicating the result of Network Service update.

Example 9 may include the Network Functions Virtualisation Orchestrator comprising one or more processors to:

receive a request from Network Manager to update an Network Service that contains the Virtualised Network Function that is part of a gNB; and send the Network Service lifecycle change notification indicating the start of Network Service update to Network Manager; and send the Network Service Lifecycle Change notification indicating the result of Network Service update to Network Manager.

Example 10 may include the subject matter of examples 8 and 9 and/or some other example herein, wherein the Network Service update request is to instantiate the Virtualised Network Function part of a gNB, and includes the parameter instantiateVnfData providing the information for the Virtualised Network Function part of the gNB.

Example 11 may include the subject matter of examples 8 to 10 and/or some other example herein, wherein the parameter instantiateVnfData contains attribute extVirtualLink specifying the transport network requirements between Virtualised Network Function part and Physical Network Function part of the gNB, and/or attribute locationConstraints indicating the location constraints for the Virtualised Network Function part of the gNB to be instantiated.

Example 12 may include the subject matter of examples 8 and 9 and/or some other example herein, wherein the Network Service update request is to update the transport network requirements between the Virtualised Network Function part and Physical Network Function part of a gNB.

Example 13 may include the subject matter of examples 8 and 9 and/or some other example herein, wherein the Network Service update request is to update the location constraints where the Virtualised Network Function part of the gNB to be deployed.

Example 14 may include an apparatus comprising means to perform one or more elements of a method described in or related to any of examples 1-13, or any other method or process described herein.

Example 15 may include one or more non-transitory computer-readable media comprising instructions to cause an electronic device, upon execution of the instructions by one or more processors of the electronic device, to perform one or more elements of a method described in or related to any of examples 1-13, or any other method or process described herein.

Example 16 may include an apparatus comprising logic, modules, and/or circuitry to perform one or more elements of a method described in or related to any of examples 1-13, or any other method or process described herein.

Example 17 may include a method, technique, or process as described in or related to any of examples 1-13, or portions or parts thereof.

Example 18 may include an apparatus comprising: one or more processors and one or more computer readable media comprising instructions that, when executed by the one or more processors, cause the one or more processors to perform the method, techniques, or process as described in or related to any of examples 1-13, or portions thereof.

Example 19 may include a method of communicating in a wireless network as shown and described herein.

Example 20 may include a system for providing wireless communication as shown and described herein.

Example 21 may include a device for providing wireless communication as shown and described herein.

Examples provide an apparatus for instantiating a virtualised part of a next generation Node B, gNB, comprising: a Network Functions Virtualisation Orchestrator, operable to carry out any one or more of: receive a request from a Network Manager to on-board a Virtualised Network Function package for the virtualized part of a gNB, if the Virtualised Network Function package has not yet been on-boarded; on-board the Virtualised Network Function package for the virtualized part of the gNB; send a first response to the Network Manager about successful on-boarding of the Virtualised Network Function package;

and/or receive a request from the Network Manager to on-board a Physical Network Function Descriptor for the non-virtualized part of the gNB, if the Physical Network Function Descriptor has not yet been on-boarded; on-board the Physical Network Function Descriptor for the non-virtualized part of the gNB; send a second response to the Network Manager about successful on-boarding of the Physical Network Function Descriptor;

and/or receive a request from the Network Manager to on-board a Network Service Descriptor referencing the Virtualised Network Function package and the Physical Network Function Descriptor, if the Network Service Descriptor has not yet been on-boarded; on-board the Network Service Descriptor; send a third response to the Network Manager about successful on-boarding of the Network Service Descriptor;

and/or receive a request from the Network Manager to enable the Virtualised Network Function package if the Virtualised Network Function package is not enabled; enable the Virtualised Network Function package; send a fourth response to the Network Manager about successful enabling of the Virtualised Network Function package;

and/or receive a request from the Network Manager to enable the Network Service Descriptor if the Network Service Descriptor is not enabled; enable the Network Service Descriptor; send a fifth response to the Network Manager about successful enabling of the Network Service Descriptor.

In some examples, the Network Functions Virtualisation Orchestrator, is further operable to: receive a request from the Network Manager to create a Network Service Identifier for the Network Service Descriptor; create the Network Service Identifier for the Network Service Descriptor; and send a sixth response to the Network Manager about successful creation of the Network Service Identifier.

In some examples, the Network Functions Virtualisation Orchestrator, is further operable to: receive a request from the Network Manager to update a Network Service Identifier for the Network Service Descriptor; update the Network Service Identifier for the Network Service Descriptor; and send a sixth response to the Network Manager about successful update of the Network Service Identifier.

In some examples, the virtualized part of the gNB is implemented as a Virtual Network Function and the non-virtualized part of the gNB is implemented as a Physical Network Function.

In some examples, the Network Service Descriptor contains a Virtualised Network Function Forwarding Graph Descriptor and a Virtual Link Descriptor including a transport network requirement(s) between the Virtualised Network Function part of the gNB and the Physical Network Function of the gNB.

In some examples, the Network Functions Virtualisation Orchestrator is further operable to send a Network Service lifecycle change notification indicating a start of the Network Service instantiation or update.

In some examples, the first response comprises an onboardedVnfPkgInfold parameter and a vnfdId parameter.

In some examples, the second response comprises a pnfdInfold parameter.

In some examples, the third response comprises a nsdInfold parameter.

In some examples, the sixth response comprises a nsInstanceId parameter.

In some examples, on-boarding comprises loading relevant information for use by the apparatus to instantiate the virtualised part of a gNB.

In some examples, the Network Service Descriptor contains one or more parameters, including: additionalParamForVnf providing information for the Virtualised Network Function part of the gNB to be instantiated; locationConstraints indicating the location constraints for the Virtualised Network Function part of the gNB to be instantiated; and pnfInfo providing information on the Physical Network Function part of the gNB.

In some examples, the Network Service Descriptor contains a parameter instantiateVnfData containing: an attribute extVirtualLink specifying transport network requirement(s) between the Virtualised Network Function part and the Physical Network Function part of the gNB that has been updated; and/or an attribute locationConstraints indicating the location constraints for the Virtualised Network Function part of the gNB that has been updated.

In some examples, the apparatus instantiates the virtualised part of the gNB by instantiating a new Network Service.

In some examples, the apparatus instantiates the virtualised part of the gNB by updating an existing Network Service.

In some examples, the apparatus updates an existing Network Service using a parameter updateType="InstantiateVnf".

Examples also provide an apparatus for instantiating a virtualised part of a next generation Node B, gNB, comprising: a Network Manager operable to carry out any one or more of:

send a request to a Network Functions Virtualisation Orchestrator to on-board a Virtualised Network Function package for the virtualized part of a gNB, if the Virtualised Network Function package has not yet been on-boarded; and receive a first response from the Network Functions Virtualisation Orchestrator about successful on-boarding of the Virtualised Network Function package;

and/or send a request to a Network Functions Virtualisation Orchestrator to on-board a Physical Network Function Descriptor for the non-virtualized part of the gNB, if the Physical Network Function Descriptor has not yet been on-boarded; and receive a second response from the Network Functions Virtualisation Orchestrator about successful on-boarding of the Physical Network Function Descriptor;

and/or send a request to a Network Functions Virtualisation Orchestrator to on-board a Network Service Descriptor referencing the Virtualised Network Function package and the Physical Network Function Descriptor, if the Network Service Descriptor has not yet been on-boarded; and receive a third response from the Network Functions Virtualisation Orchestrator about successful on-boarding of the Network Service Descriptor;

and/or send a request to a Network Functions Virtualisation Orchestrator to enable the Virtualised Network Function package if the Virtualised Network Function package is not enabled; and receive a fourth response from the Network Functions Virtualisation Orchestrator about successful enabling of the Virtualised Network Function package; and/or send a request to a Network Functions Virtualisation Orchestrator to enable the Network Service Descriptor if the Network Service Descriptor is not enabled; and receive a fifth from the Network Functions Virtualisation Orchestrator about successful enabling of the Network Service Descriptor.

In some examples, the Network Manager is further operable to: send a request to the Network Functions Virtualisation Orchestrator to create a Network Service Identifier for the Network Service Descriptor; and receive a sixth response from the Network Functions Virtualisation Orchestrator about successful creation of the Network Service Identifier.

In some examples, the Network Functions Virtualisation Orchestrator, is further operable to: send a request to the Network Functions Virtualisation Orchestrator to update a Network Service Identifier for the Network Service Descriptor; and receive a sixth response from the Network Functions Virtualisation Orchestrator about successful update of the Network Service Identifier.

In some examples, the virtualized part of the gNB is implemented as a Virtual Network Function and the non-virtualized part of the gNB is implemented as a Physical Network Function.

In some examples, the Network Service Descriptor contains a Virtualised Network Function Forwarding Graph Descriptor and a Virtual Link Descriptor including a transport network requirement(s) between the Virtualised Network Function part of the gNB and the Physical Network Function of the gNB.

In some examples, the Network Manager is further operable to receive a Network Service lifecycle change notification indicating a start of the Network Service instantiation or update.

In some examples, the first response comprises an onboardedVnfPkgInfold parameter and a vnfdId parameter. In some examples, the second response comprises a pnfdInfold parameter. In some examples, the third response comprises a nsdInfold parameter. In some examples, the sixth response comprises a nsInstanceId parameter. In some examples, on-boarding comprises loading relevant information for use by the apparatus to instantiate the virtualised part of a gNB.

In some examples, the Network Service Descriptor contains one or more parameters, including: additionalParamForVnf providing information for the Virtualised Network Function part of the gNB to be instantiated; locationConstraints indicating the location constraints for the Virtualised Network Function part of the gNB to be instantiated; and pnfInfo providing information on the Physical Network Function part of the gNB.

In some examples, the Network Service Descriptor contains a parameter instantiateVnfData containing: an attribute extVirtualLink specifying transport network requirement(s) between the Virtualised Network Function part and the Physical Network Function part of the gNB that has been updated; and/or an attribute locationConstraints indicating the location constraints for the Virtualised Network Function part of the gNB that has been updated.

In some examples, the apparatus instantiates the virtualised part of the gNB by instantiating a new Network Service. In some examples, the apparatus instantiates the virtualised part of the gNB by updating an existing Network Service. In some examples, the apparatus updates an existing Network Service using a parameter updateType="InstantiateVnf".

Examples also provide one or more non-transitory computer-readable media comprising instructions to cause an electronic device, upon execution of the instructions by one or more processors of the electronic device, to perform one or more elements of a method (e.g. in a Network Functions Virtualisation Orchestrator) comprising one or more of: receiving a request from a Network Manager to on-board a Virtualised Network Function package for the virtualized part of a gNB, if the Virtualised Network Function package has not yet been on-boarded; on-boarding the Virtualised Network Function package for the virtualized part of the gNB; sending a first response to the Network Manager about successful on-boarding of the Virtualised Network Function package;

and/or receiving a request from the Network Manager to on-board a Physical Network Function Descriptor for the non-virtualized part of the gNB, if the Physical Network Function Descriptor has not yet been on-boarded; on-boarding the Physical Network Function Descriptor for the non-virtualized part of the gNB; sending a second response to the Network Manager about successful on-boarding of the Physical Network Function Descriptor;

and/or receiving a request from the Network Manager to on-board a Network Service Descriptor referencing the Virtualised Network Function package and the Physical Network Function Descriptor, if the Network Service Descriptor has not yet been on-boarded; on-boarding the Network Service Descriptor; sending a third response to the Network Manager about successful on-boarding of the Network Service Descriptor;

and/or receiving a request from the Network Manager to enable the Virtualised Network Function package if the Virtualised Network Function package is not enabled; enabling the Virtualised Network Function package; sending a fourth response to the Network Manager about successful enabling of the Virtualised Network Function package; and/or receiving a request from the Network Manager to enable the Network Service Descriptor if the Network Service Descriptor is not enabled; enabling the Network Service Descriptor; sending a fifth response to the Network Manager about successful enabling of the Network Service Descriptor.

In some examples, the is the method further comprises: receiving a request from the Network Manager to create a Network Service Identifier for the Network Service Descriptor; creating the Network Service Identifier for the Network Service Descriptor; and sending a sixth response to the Network Manager about successful creation of the Network Service Identifier.

In some examples, the method further comprises: receiving a request from the Network Manager to update a Network Service Identifier for the Network Service Descriptor; updating the Network Service Identifier for the Network Service Descriptor; and sending a sixth response to the Network Manager about successful update of the Network Service Identifier.

In some examples, the virtualized part of the gNB is implemented as a Virtual Network Function and the non-virtualized part of the gNB is implemented as a Physical Network Function.

In some examples, the Network Service Descriptor contains a Virtualised Network Function Forwarding Graph Descriptor and a Virtual Link Descriptor including a transport network requirement(s) between the Virtualised Network Function part of the gNB and the Physical Network Function of the gNB.

In some examples, the method further comprises sending a Network Service lifecycle change notification indicating a start of the Network Service instantiation or update.

In some examples, the first response comprises an onboardedVnfPkgInfoId parameter and a vnfdId parameter. In some examples, the second response comprises a pnfdInfoId parameter. In some examples, the third response comprises a nsdInfoId parameter. In some examples, the sixth response comprises a nsInstanceId parameter. In some examples, on-boarding comprises loading relevant information for use by the apparatus to instantiate the virtualised part of a gNB.

In some examples, the Network Service Descriptor contains one or more parameters, including: additionalParamForVnf providing information for the Virtualised Network Function part of the gNB to be instantiated; locationConstraints indicating the location constraints for the Virtualised Network Function part of the gNB to be instantiated; and pnfInfo providing information on the Physical Network Function part of the gNB.

In some examples, the Network Service Descriptor contains a parameter instantiateVnfData containing: an attribute extVirtualLink specifying transport network requirement(s) between the Virtualised Network Function part and the Physical Network Function part of the gNB that has been updated; and/or an attribute locationConstraints indicating the location constraints for the Virtualised Network Function part of the gNB that has been updated.

In some examples, the method comprises instantiating the virtualised part of the gNB by instantiating a new Network Service. In some examples, the method comprises instantiating the virtualised part of the gNB by updating an existing Network Service. In some examples, the method comprises updating an existing Network Service using a parameter updateType="InstantiateVnf".

Examples also provide one or more non-transitory computer-readable media comprising instructions to cause an electronic device, upon execution of the instructions by one or more processors of the electronic device, to perform one or more elements of a method in a Network manager.

Examples also provide a method corresponding to the above-described non-transitory computer-readable media based methods.

In the foregoing, the interface names, and the names of the entities involved, are only exemplary and are descriptive of the logical entities involved in the communications over the respectively named interfaces.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The invention claimed is:
1. An apparatus comprising:
an interface; and
one or more processors, coupled with the interface, to:
send a request to a network functions virtualization (NFV) orchestrator (NFVO) to update a network service that contains a virtualized network function (VNF) that is part of a base station;

receive from the NFVO a network service lifecycle change notification indicating a start of a network service update; and receive from the NFVO the network service lifecycle change notification indicating a result of the network service update, wherein the network service update request is to update a transport network requirements between the VNF part and a physical network function part of the base station.

2. The apparatus of claim 1, further comprising the NFVO, the NFVO comprising one or more processors to:

receive a request from a network manager to update a network service that contains the VNF that is part of the base station; and send the network service lifecycle change notification indicating the start of the network service update to the network manager; and send the network service lifecycle change notification indicating the result of the network service update to the network manager.

3. The apparatus of claim 1, wherein the network service update request is to instantiate the VNF and includes instantiation information for the VNF part of the base station.

4. The apparatus of claim 3, wherein the instantiation information contains an attribute specifying the transport network requirements between the VNF part and the physical network function part of the base station, and/or an attribute indicating location constraints for the VNF part of the base station to be instantiated.

5. A method, comprising:

sending a request to a network functions virtualization (NFV) orchestrator NFVO) to update a network service that contains a virtualized network function (VNF) that is part of a base station;

receiving from the NFVO a network service lifecycle change notification indicating a start of a network service update; and receiving from the NFVO the network service lifecycle change notification indicating a result of the network service update, wherein the network service update request is to update a transport network requirements between the VNF part and a physical network function part of the base station.

6. The method of claim 5, wherein the network service update request is to instantiate the VNF part of the base station and includes instantiation information for the VNF part of the base station.

7. The method of claim 6, wherein the instantiation information contains an attribute specifying transport network requirements between the VNF part of the base station and the physical network function part of the base station, and/or an attribute indicating location constraints for the VNF part of the base station to be instantiated.

* * * * *